United States Patent
Humble

(10) Patent No.: US 7,571,101 B2
(45) Date of Patent: *Aug. 4, 2009

(54) QUANTIFYING PSYCHOLOGICAL STRESS LEVELS USING VOICE PATTERNS

(76) Inventor: Charles Humble, 1649 W. 22nd St., Miami Beach, FL (US) 33140

( * ) Notice: Subject to any disclaimer, the term of this patent is extended or adjusted under 35 U.S.C. 154(b) by 437 days.

This patent is subject to a terminal disclaimer.

(21) Appl. No.: 11/441,419

(22) Filed: May 25, 2006

(65) Prior Publication Data

US 2007/0276669 A1 Nov. 29, 2007

(51) Int. Cl.
G10L 21/00 (2006.01)
(52) U.S. Cl. ...................................... 704/273
(58) Field of Classification Search ................ 704/270, 704/273
See application file for complete search history.

(56) References Cited

U.S. PATENT DOCUMENTS

| | | | | |
|---|---|---|---|---|
| 3,971,034 | A * | 7/1976 | Bell et al. ................. | 346/33 R |
| 5,539,861 | A * | 7/1996 | DeSimone .................. | 704/234 |
| 6,006,188 | A * | 12/1999 | Bogdashevsky et al. ..... | 704/270 |
| 6,151,571 | A * | 11/2000 | Pertrushin .................. | 704/209 |
| 6,275,806 | B1 * | 8/2001 | Pertrushin .................. | 704/272 |
| 6,353,810 | B1 * | 3/2002 | Petrushin .................. | 704/236 |
| 6,427,137 | B2 * | 7/2002 | Petrushin .................. | 704/273 |
| 6,463,415 | B2 * | 10/2002 | St. John ..................... | 704/273 |
| 6,480,826 | B2 * | 11/2002 | Pertrushin .................. | 704/270 |
| 6,697,457 | B2 * | 2/2004 | Petrushin ................. | 379/88.08 |
| 7,065,490 | B1 * | 6/2006 | Asano et al. ................ | 704/275 |
| 7,165,033 | B1 * | 1/2007 | Liberman .................. | 704/270 |
| 7,191,134 | B2 * | 3/2007 | Nunally ..................... | 704/270 |
| 7,222,075 | B2 * | 5/2007 | Petrushin .................. | 704/270 |
| 7,283,962 | B2 * | 10/2007 | Meyerhoff et al. .......... | 704/270 |
| 7,313,524 | B1 * | 12/2007 | Minamino .................. | 704/270 |
| 7,340,393 | B2 * | 3/2008 | Mitsuyoshi ................. | 704/207 |
| 7,369,991 | B2 * | 5/2008 | Manabe et al. ............. | 704/235 |
| 7,451,079 | B2 * | 11/2008 | Oudeyer .................... | 704/205 |
| 2002/0194006 | A1 * | 12/2002 | Challapali ................. | 704/276 |
| 2003/0182123 | A1 * | 9/2003 | Mitsuyoshi ................ | 704/270 |

* cited by examiner

Primary Examiner—Michael N Opsasnick
(74) Attorney, Agent, or Firm—McHale & Slavin, P.A.

(57) ABSTRACT

A system and method of assigning a numeric score to a voice pattern of a human subject wherein the score is indicative of the psychological stress level of the human subject. A verbal utterance of a human subject is converted into electrical signals to provide a subject wave pattern. The pattern is quantified and compared with known voice pattern characteristics which exhibit a sequential progression in the degree of blocking in the pattern, wherein each of the known voice patterns is assigned a numerical value range. A numerical value obtained from calculations is assigned to the subject wave pattern based on the comparison. The numerical value represents the degree of blocking present in the subject wave pattern which correlates to the amount of psychological stress exhibited by the human subject.

9 Claims, 11 Drawing Sheets

Session Parameters

Pre-Interview Data

| | | | |
|---|---|---|---|
| Date | | Examiner | |
| Test Format | ▼ | Type of Test | ▼ |
| Test Medium | ▼ | Offense | ▼ |
| Time Began | ▼ | Subject | |
| Requested | ▼ | Outside Agency | |
| Case No. | ▼ | CVSA Unit No. | |
| ☑ Actively Validate Pattern Integrity | | No. of Questions | |

Post-Interview Data

| | | | |
|---|---|---|---|
| Verification | ▼ | Cold Call | ▼ |
| Confession | ▼ | Deception | ▼ |
| Time Ended: | | | |

[ Enter ]   [ Cancel ]
    55           56

QUANTIFYING PSYCHOLOGICAL STRESS LEVELS USING VOICE PATTERNS

RELATED APPLICATIONS

This application is related to U.S. patent application Ser. No. 10/737,530, filed Dec. 15, 2003, now U.S. Pat. No. 7,321,855 which is hereby incorporated by reference.

FIELD OF THE INVENTION

This invention is related to the field of voice stress analysis utilizing computer technology. More specifically it relates to a system and method for generating a numerical score for a voice pattern which is indicative of the psychological stress level of the subject.

BACKGROUND OF THE INVENTION

Devices which measure psychological stress levels have been used as an indicator of deception and are commonly known as lie detection devices. Originally used in the field of law enforcement, these devices are now also commonly used in the military and the private sector. The first type of stress detection device, known as the polygraph, measures changes in a person's body functions related to the stress of deception, including changes in their heart rate, breathing, and electrodermal activity. In the beginning of polygraph examinations the person being tested had sensors placed on various parts of their body to measure the above noted functions and these sensors were in turn connected by wires to the polygraph device. A trained individual interpreted the output of the sensors to determine if the person being tested had exhibited any symptoms of stress indicative of uttering false statements. Present day polygraph devices are computer implemented. However, the basic technology of the device has changed very little.

Advances in the field of lie detection have been focused on the detection of stress in speech. These results could be used in a portable lie detection device which could be used "in the field." The advantage of voice analysis over the polygraph is that the subject being tested does not have to be physically connected to the device and thus voice analysis is a non-invasive method of lie detection or truth verification.

DESCRIPTION OF THE PRIOR ART

The scientific basis for voice analysis was provided by the discovery of vocal chord micro-tremors in the 1950's. Olof Lippold, a researcher at University College. London, published in 1971 the results of research he had started in 1957 in the magazine Scientific American. Lippold's article, entitled "Physiological Tremor", explored the initial discovery by Martin Halliday and Joe Redfeam of the phenomena a decade previously at the National Hospital in London. Halliday and Redfeam discovered that the contraction of a voluntary muscle is accompanied by tremors of the muscle in the form of minute oscillations. According to Lippold, all muscles in the body, including the vocal chords, vibrate at a specified frequency range. Lippold explained that the tremor is believed to be a function of the signals to and from motor neurons and that it is analogous to a self-adjusting closed loop servo system and that muscles tighten and loosen as they seek to maintain a constant tension. In times of stress, the body prepares for fight or flight by increasing the readiness of the muscles to spring into action. The vibration of the vocal chords, in this situation, increases. A method for the detection of psychological stress by evaluating physical changes in the human voice is disclosed in U.S. Pat. No. 3,971,034 issued to Bell, the contents of which are herein incorporated by reference.

Voice stress patterns were first introduced as a method of measuring psychological stress beginning with the Psychological Stress Evaluator designed by W. H. Ford, A. D. Bell, and C. R. McQuiston in 1971. The instrument recorded tracings on a strip chart utilizing EKG paper and a heated stylus. Each response produced movements of the stylus that made vertical lines on the paper which were recognizable as either stressful or non-stressful patterns. The determination was made according to the length, and to some degree, the shape of the pattern. However, no effort was made to establish exact patterns or to provide a formula for determining deception, lending considerable confusion to the evaluation process and creating many errors.

Generally speaking, evaluated voice patterns come in all shapes and sizes. These patterns include variations of male, female, regional and international linguistic variations. Regardless, human voice patterns share many characteristics and a similar stress-related trait, namely the tendency of a stress pattern to form a roughly rectangular pattern. This tendency is commonly known as "blocking."

In the prior art devices these voice patterns were examined by human examiners and a determination of psychological stress was made empirically. A possible problem with this system is that the judgement is made only by visual observation, therefore human frailties such as fatigue or the personal bias of the examiner might alter the scoring of the voice pattern. Also, since the results are based on individual human judgement, they can be influenced by the quality of training and the cumulative field experience of the individual examiner. This has the ability to create inconsistencies in the scoring between individual examiners.

Thus what is lacking in the art of voice stress analysis is a system and method which eliminates the human factor in the evaluation process. An electronic or computer assisted evaluation system which utilizes an algorithm to evaluate the same voice pattern that a human examiner does and produce consistent, repeatable results.

SUMMARY OF THE INVENTION

The invention is directed to a system which employs software installed on a computer to analyze a voice pattern and assign a numerical score to the pattern based on the stress level of the subject.

Accordingly, it is an objective of the instant invention to provide a method of assigning a numeric score to a voice pattern of a human subject as an indicator of the stress level of the subject wherein a computer is employed to analyze the voice pattern.

It is a further objective of the instant invention to provide a computer with software utilizing an algorithm which can quantify a voice pattern to generate a score indicative of the stress level of the subject.

It is yet another objective of the instant invention to provide a method of assigning a numeric score to a voice pattern sample, utilizing software with an algorithm, which can be used in voice stress analysis examination as a control value in order to ensure consistent results.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

In light of the aforementioned objectives, the instant invention proposes a computer implemented method of assigning a numeric score to a voice pattern sample of a human wherein the score is indicative of the psychological stress level of the human.

The method comprises the steps of converting the verbal utterance of a human into electrical signals plotted on a Cartesian coordinate system to provide a subject wave pattern plotted along an x and y axis; filtering the subject wave pattern to remove extraneous values at the leading and trailing edges of the wave pattern to provide a pre-cursor, a post-cursor and a working frame, wherein the working frame is utilized for the analysis; providing a consecutive series of known voice pattern characteristics, wherein the consecutive series exhibits a sequential progression in the degree of blocking in the voice pattern; assigning a numerical value to each of the consecutive series of known voice pattern characteristics based on the degree of blocking in the pattern; analyzing the voice wave pattern within the working frame to provide quantified data defining a set of characteristics for the voice wave pattern; providing quantified data defining a set of characteristics for the consecutive series of known voice pattern characteristics; comparing the quantified data of subject wave pattern to quantified data of each of the known voice pattern characteristics to ascertain a match between the subject wave pattern and one or more of the known voice pattern characteristics; and returning a numerical value for the refined wave pattern based on one or more matching known voice pattern characteristics.

BRIEF DESCRIPTION OF THE FIGURES

FIG. 11 is an example of a Sessions Parameters dialog box; and

FIG. 12 is an example of a Questions dialog box.

DETAILED DESCRIPTION OF THE INVENTION

While the present invention is susceptible of embodiment in various forms, there is shown in the accompanying drawings and will herein after be described a presently preferred embodiment with the understanding that the present disclosure is to be considered an exemplification of the invention and is not intended to limit the invention to the specific embodiments illustrated.

Figure 1:
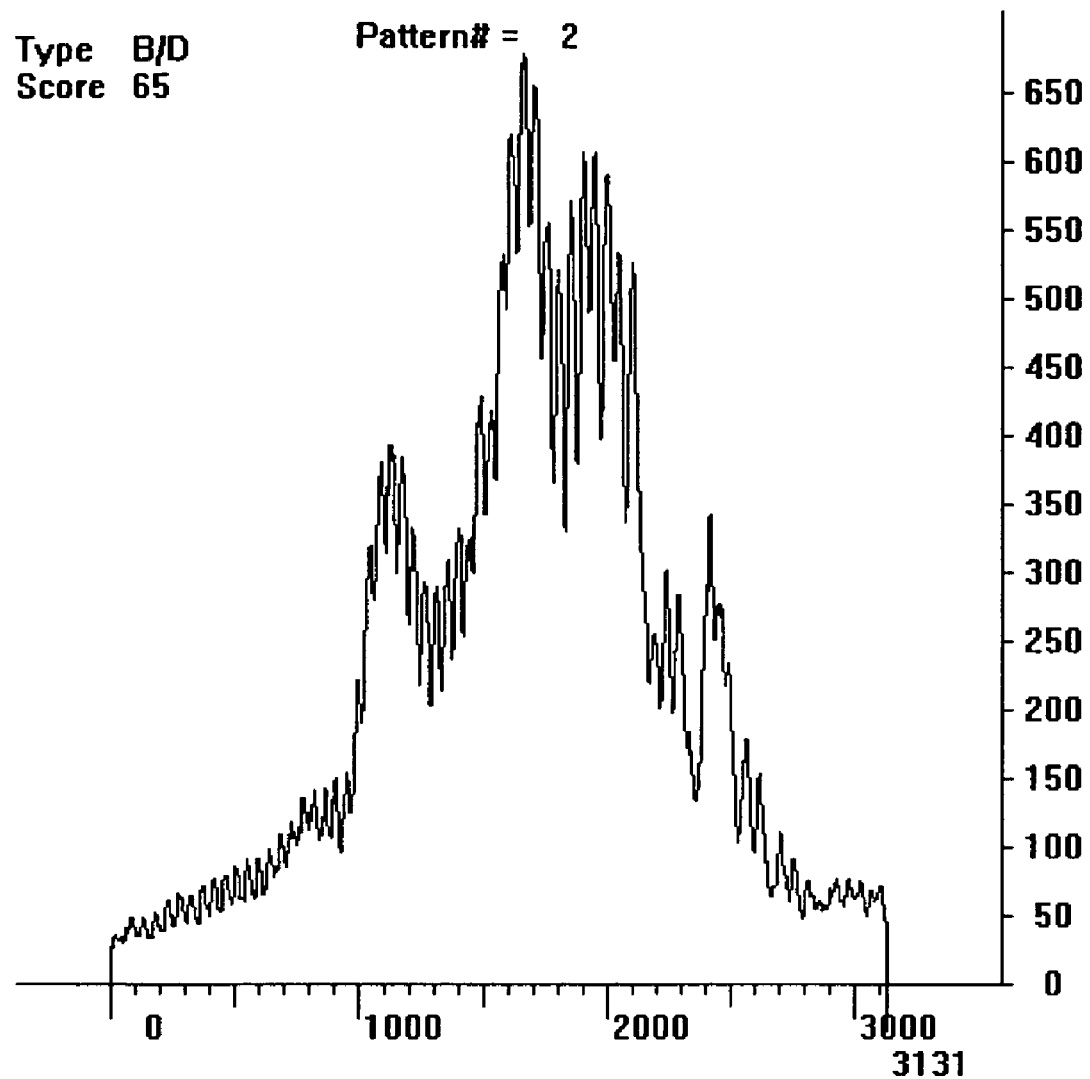
FIG. 1 is an illustrative example of a voice pattern sample.
Figure 2:
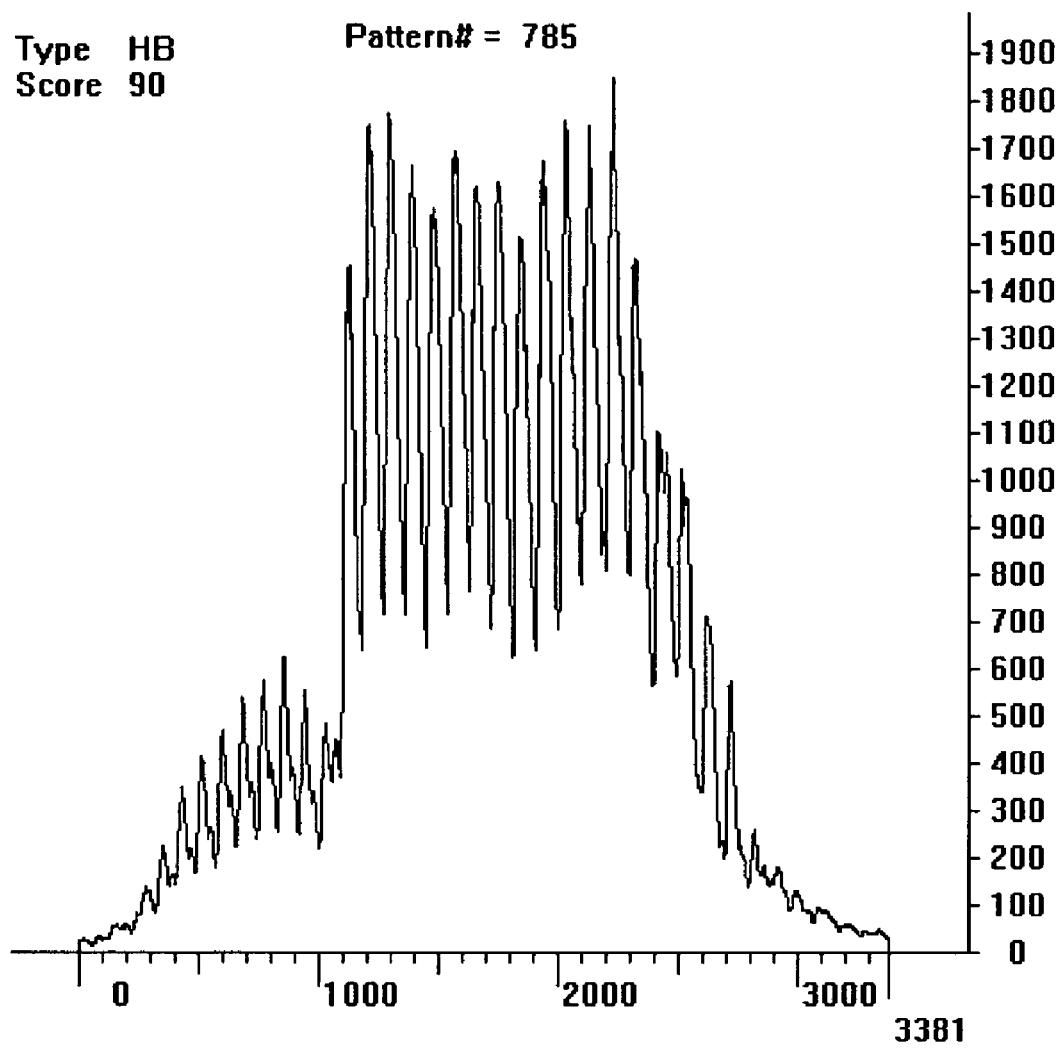
FIG. 2 is another illustrative example of a voice pattern sample.

The preferred embodiment of the present invention is designed to be implemented in a Computer Voice Stress Analyzer™ (CVSA) system in the form of software resident on a computer work station. The computer workstation can either include or be in communication with a transducer means for converting audible sounds into electrical signals and a means for converting frequency modulations in the electrical signals to amplitude modulations to produce a visible pattern which can be displayed on a monitor or other suitable display means. The computer workstation also includes a microphone for obtaining vocal recordings of the subject. Alternatively, the sounds to be analyzed can be stored on any suitable recording medium which is readable by the computer workstation. The workstation also includes a monitor which displays the voice pattern to an operator. The change in frequency associated with deceptive behavior are manifested in a voice pattern sample by a dampening of selected frequency variations, which, when graphically portrayed, result in a roughly rectangular pattern, referred to herein as pattern "blocking." An example of this phenomena is shown in FIGS. 1 and 2 which illustrate voice patterns for the same spoken word. FIG. 1 is spoken in a truthful context and FIG. 2 is spoken in a deceptive context. The voice pattern samples can be observed by an operator to make a visual determination as to the degree of blocking. For purposes of interpretations of psychological stress, voice pattern blocking can be categorized and scored as follows. A higher score being indicative of probable deception. (The slopes are expressed as an angular measurement in degrees with reference to the horizontal y=0).

Hard block—score is more than 90%. Classification is primary derived from one strong flat slope (defined as a slope <20°).

Medium black—score equals 84% to 89% inclusive. Classification is primarily derived from one moderately flat slope (defined as a slope between 20° and 28°.

Tendency to block—score equals 80% to 83% inclusive. Classification is primarily derived from one fairly flat slope (defined as a slope between 31° and 36°).

Diagonal—score equals 50% to 79% inclusive. Classification is primarily derived from a steep slope (defined as a slope between 37° and 90°). This classification is considered to be "No Blocking" and truthful.

It is necessary to provide a human operator with a sufficient level of training to enable the operator to properly score a visual representation of a spoken utterance. When the operator makes a empirical judgement, as in the prior art systems, it is possible that personal biases may enter into the scoring. Also, the score may be influenced by the relative experience of the operator. The present invention provides a system and method whereby the human source of inaccuracies can be corrected for and replaced by generating a computer generated score. This can also provide a valuable non-biased second opinion, which can be employed as a guideline for a human operator.

To generate a complete and accurate score a computer algorithm is employed to identify the voice pattern's characteristics, nuances and blocking traits. Nuances distort the voice pattern thereby affecting the score. Some nuances may be corrected programmatically, but if the pattern is too distorted it must be discarded and retaken.

Figure 3:
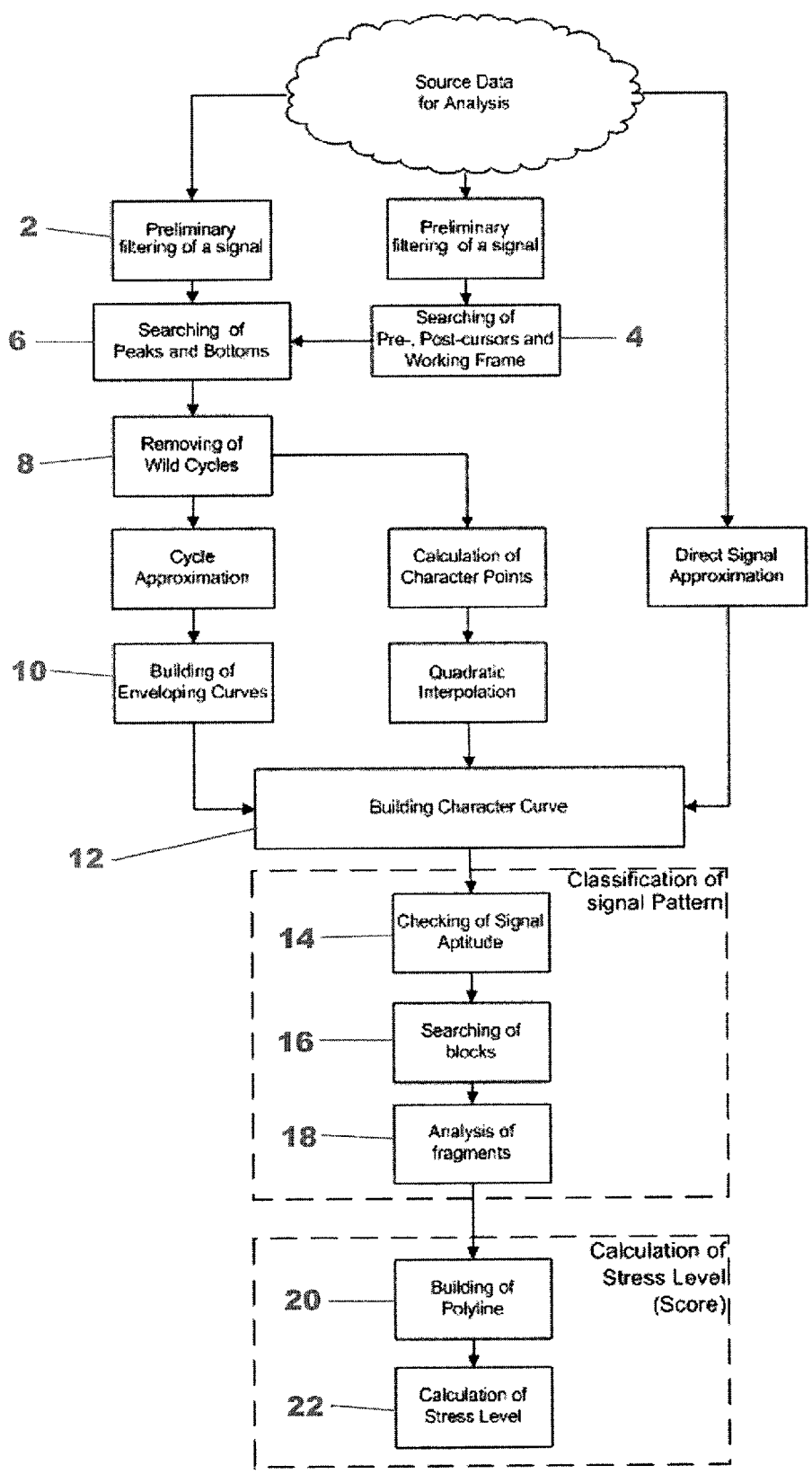
FIG. 3 is a flowchart illustrating the steps of the invention for isolating the relevant portion of the voice pattern and generating a numerical score.

A voice pattern sample is initially saved as an array of integer data corresponding to a Cartesian coordinate system (x,y). FIG. 3 illustrates the steps of the method of the instant invention in which the integer data is processed to yield a score indicative of the blocking present in the pattern.

Basic Data Analysis:

1. Preliminary filtering of the signal to remove points which are at least twice the maximum length of a cycle based on the average length of neighboring points is preformed in step 2. The signal value of each point is a simple average of each set of points symmetrically on the right and left of the point under evaluation.

2. The voice signal is divided into three fields, Pre-cursor, Working frame and Post-cursor in step 4. The Pre- and Post-cursors are non informative portions of the signal and are defined as fields in which the average signal value has the largest difference when all three fields are compared.

3. Discovery of all peaks and bottoms of the signals and their exact location takes place in step 6.

4. Removal of Wild cycles occurs in step 8. These are peaks whose value is essentially more or less than the neighboring peaks. Also, bottoms of the signals whose value is essentially more or less than the neighboring bottoms. These are indicated by triangles in FIG. 5.

Figure 4:
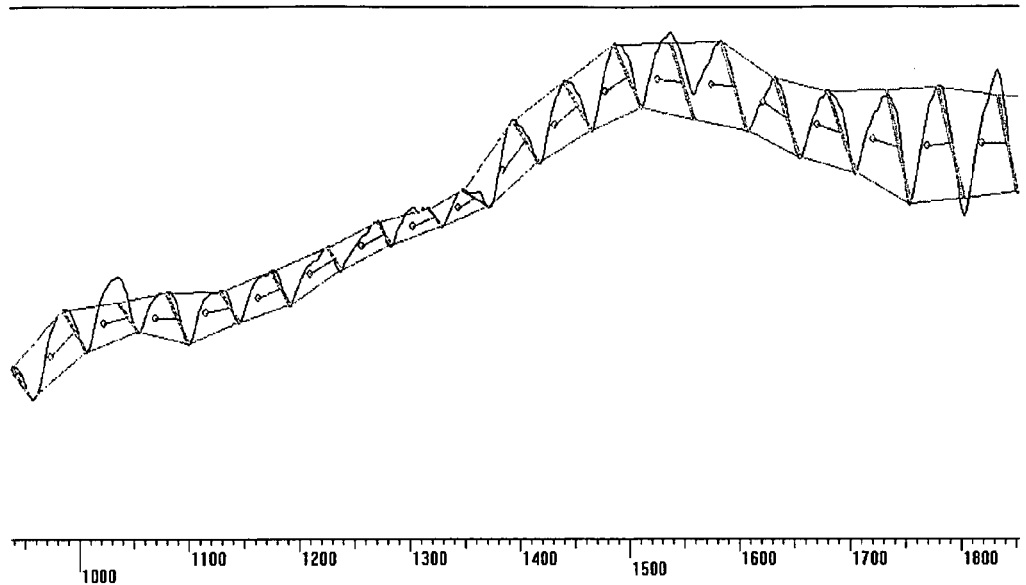
FIG. 4 is an example of an enveloping curve constructed as a polyline.
Figure 5:
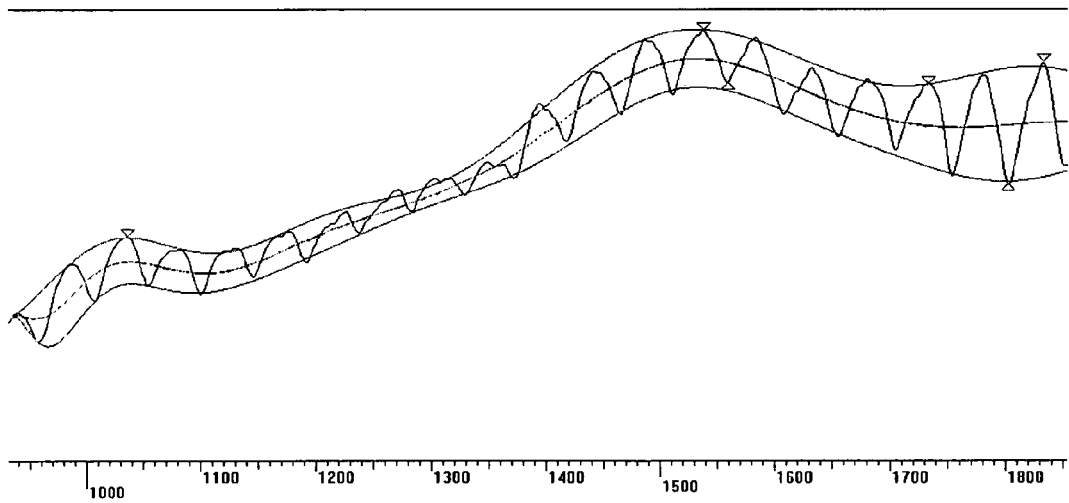
FIG. 5 is an example of an enveloping curve constructed on a method of least squares.

5. Building of Enveloping curves. In step 10, these curves are constructed based on peaks and bottoms of each signal cycle. Two methods for constructing these curves are: polyline, when straight lines connect neighboring peaks and bottoms as illustrated in FIG. 4 and approximating polynomial, based on a method of least squares as illustrated in FIG. 5.

6. Building of Characteristic Curve. In step 12 three different algorithms are employed to construct this curve. The first yields a Characteristic Curve coordinate which is a simple average of two neighboring peaks and accordant bottoms. The second is based on the enveloping curves and is built as the middle curve in between the two enveloping curves. The third is an approximating curve utilizing unprocessed signal data. Chebyshev's Polynomial is employed to construct the Characteristic curve.

Classification of Signal Pattern:

1. Checking of signal amplitude occurs in step 14. An estimation is made of the suitability of a signal for processing and are classified as follows:
   0—suitable for processing
   1—clip
   2—low volume
   3—high volume
   4—modulation problem
   5—spike
   6—static electricity
   7—other problem 2. Searching of blocks. In step 16 the characteristic curve is divided into a large number of blocks as illustrated in FIG. 4. For each of the blocks a first derivative value is calculated which is numerically equal in value to a trigonometrical function tangent of an angle between the tangent to the curve and the horizontal at this point of the characteristic curve. The value of the angle in radians may be calculated by the formula:

$$\text{angleRad} = a\tan(\text{deriv}/\text{scale}X/\text{scale}Y)$$

The same angle in degrees is:

$$\text{angleDeg} = \text{angleRad}/3.14159 * 180°$$

The score value is calculated according to the formula:

$$\text{score} = 100 - |\text{angleDeg}|/1.8$$

Naturally the following scores take place
if angleDeg=0°, then score=100%
if angleDeg=45°, then score=75%
if angleDeg=90°, then score=50%

Classification of the Characteristic curve blocks or fragments is as follows:

| Fragment Type | Score | Angle |
| --- | --- | --- |
| Diagonal | 50% ... 79% | 37° ... 39° |
| Tendency to Block | 80% ... 83% | 31° ... 36° |
| Medium Block | 84% ... 89% | 20° ... 28° |
| Hard Block | More than 90% | Less than 20° |

3. Analysis of fragments. In addition to the above noted blocks there are fragments which are derivatives of the above blocks. These are identified in step 18. Step block and Split pattern are derivatives of Hard and Medium blocks. Split pattern is also a derivative of Diagonal and Tendency blocks. A split pattern is defined as a working frame which is divided into approximately two equal parts. If it is found that some of the attributes in one half of the block are not found in the other half then it is a split pattern. A step block is defined as blocks containing patterns which are contiguous to each other. There is also a Broken Diagonal which is defined as a Diagonal block signal in which the forward or rear portion of the signal is cut or broken up.

Calculation of Stress Level:

1. Building of a Polyline. A Polyline is constructed in step 20 utilizing the data which is used to construct the Characteristic Curve. If any point on the Polyline deviates from the Characteristic Curve more than an acceptable amount the point is discarded and another one is chosen. Once the polyline is complete then the score of the stress level can be determined.

2. Calculation of stress level. In this step all the quantified data which has been calculated is used to classify and score the blocking pattern into the categories listed above. This is based on a consecutive series of known voice pattern characteristics exhibiting a sequential progression in the degree of blocking in the pattern, i.e. hard blocking, medium blocking, tendency to block, etc. Each of the known voice pattern characteristics is assigned a scoring range, as noted above. The parameters of the known voice pattern characteristics are to the quantified data to determine one or more matching known voice patterns. The score can then be calculated based on the degree of blocking. In step 22 a numerical score is returned which is indicative of the percentage of blocking present.

Figure 6:
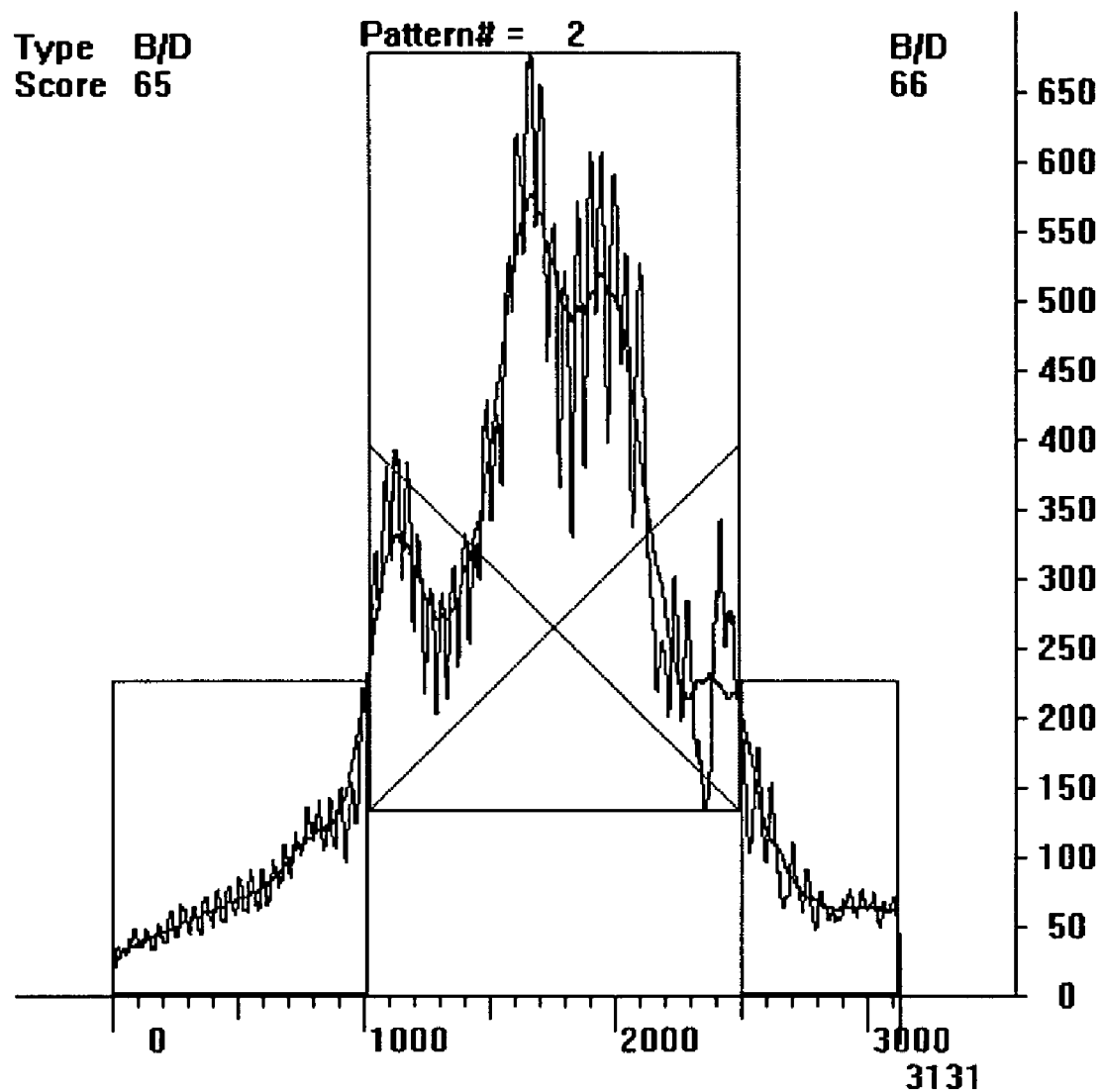
FIGS. 6-9 are examples of voice patterns which have been processed according to the instant invention.
Figure 7:
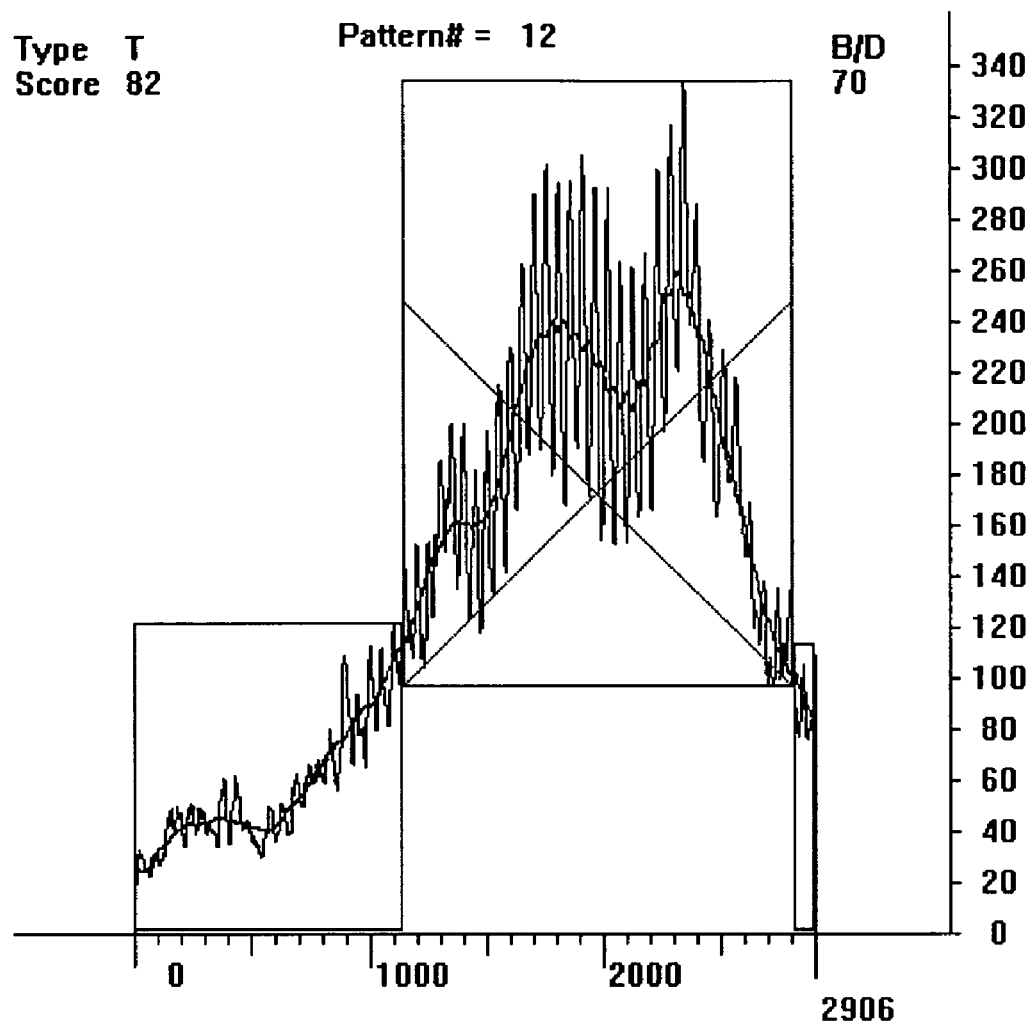
Figure 8:
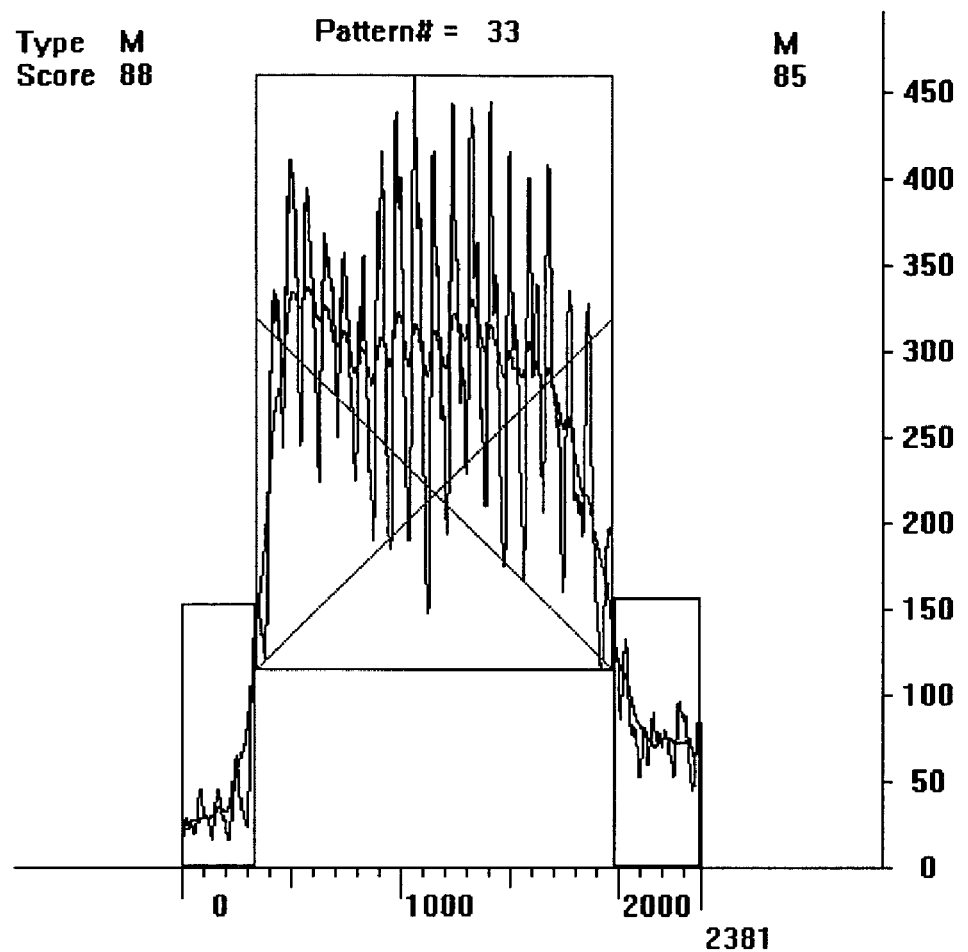
Figure 9:
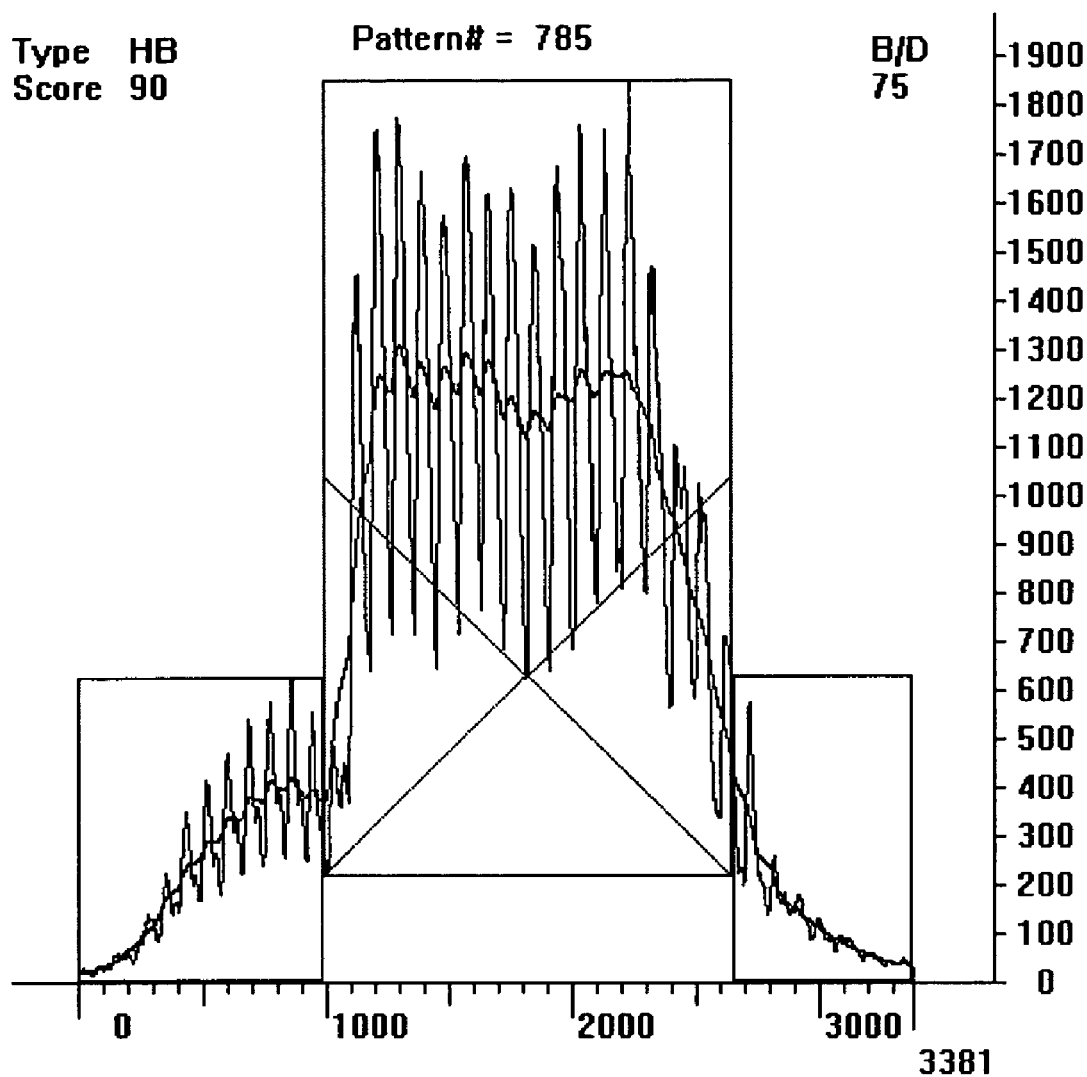

FIGS. 6-9 illustrate voice patterns with different blocking patterns. FIG. 6 is an example of a diagonal or truthful pattern. FIG. 7 is an example of a tendency to block pattern. FIG. 8 is an example of a medium block pattern and FIG. 9 is an example of a hard block or untruthful pattern.

Figure 10:
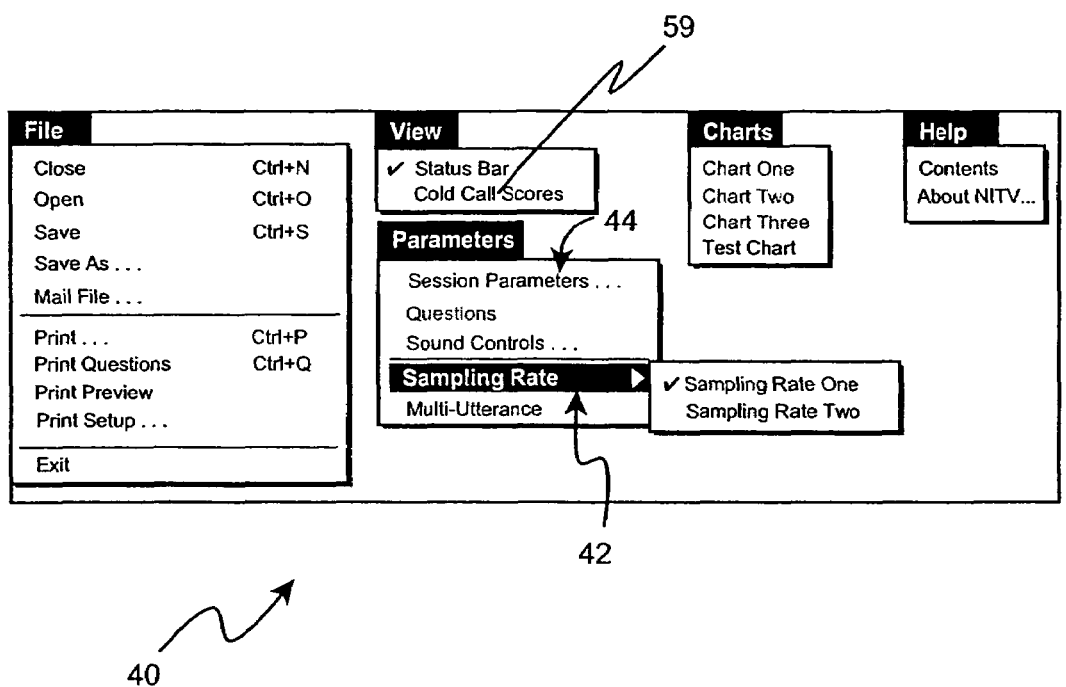
FIG. 10 is an example of a menu used in a graphical user interface appearing on a computer monitor.

In order to practice the invention the scoring algorithm is installed on a computer workstation or laptop which is used by an examiner to evaluate the voice stress in a human subject. The examination process is guided by a graphical user interface displayed on the monitor which is viewed by the examiner during the session. As shown in FIG. 10, a menu 40 can be displayed to the examiner to allow the examiner to initiate the session and set parameters for the session. The examiner can select the sampling rate 42 to select the degree of compression in the pattern. In the example shown in the menu 40, the examiner can select between two different rates.

Selection of the Sessions Parameters menu choice 44 displays the Session Parameters dialogue box 50 shown in FIG. 11. The Sessions Parameters dialog box 50 prompts the examiner to enter text information relevant to the session. The selection check box 52 allows the examiner to selectively activate an automatic validation pattern integrity.

The test format field 53 determines the type of questions used in the examination. In a preferred embodiment, the formats are preset for the type of examination, e.g. pre-employment, law enforcement applications, etc. The test medium field 54 determines how the recording is activated and deactivated. The options are "manual" and "voice activated." With "manual" the recording can be activated by an action of the examiner, such as depressing a key on the keyboard. Selecting the "enter" button 55 saves the fields to memory. Selecting the "cancel" button 56 does not save the fields to memory but maintains the previously entered data.

Figure 12:
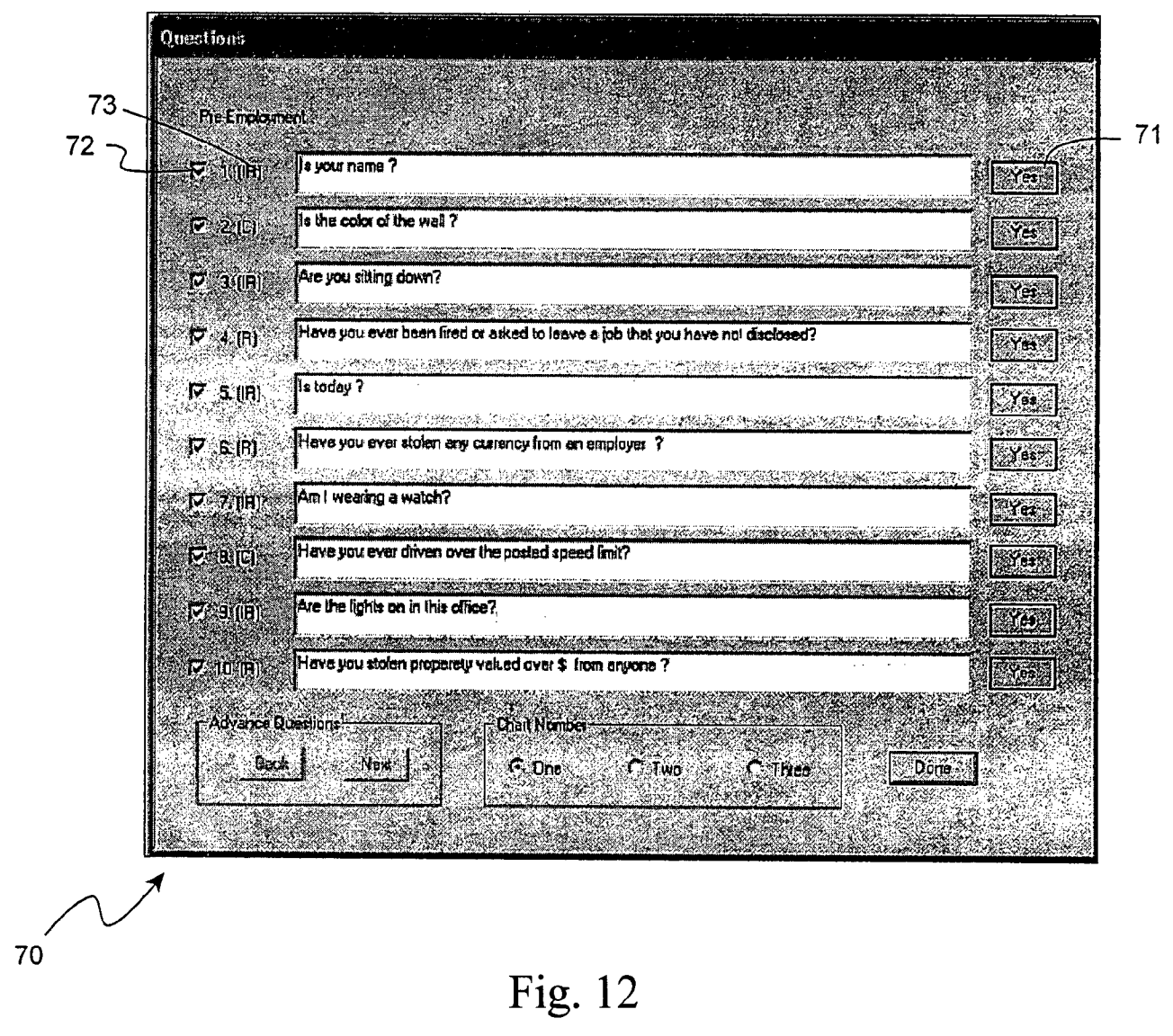

FIG. 12 illustrates the Questions dialog box 70 which is displayed to the examiner during the session. The questions are preferably editable fields and can be predefined by default questions depending on the selection in the "Test Format" field in the Sessions Parameters dialog box, FIG. 11. The buttons 71 to the right of the questions illustrates the expected answer to the question. In the example shown the answers are "yes" or "no." The check boxes 72 to the left of the questions allows the examiner to select which questions are to be active during the examination. The number and type of questions 73 is displayed to the left of the questions. In the illustrated example, there are three types of questions: Control (C), Relevant (R), and Irrelevant (IR). In the preferred embodiment, the number and type is a fixed field determined by the "Test Format" selection in the Sessions Parameters dialog box which cannot be modified.

Voice patterns are displayed to the examiner in real-time during the examination. The examiner can mark the voice pattern as either "yes" or "no" to indicate the response to the question. The score generated by the scoring algorithm is in the form of a numerical value and can be displayed in association with each pattern. In the illustrated examples, FIGS. 6-9, the score appears in the upper left hand corner of each pattern. When the "Cold Call Scores" option 59 shown in FIG. 19 is enabled, the scores are automatically generated and displayed. Alternatively, the "Cold Call Scores" option can be disabled or toggled on and off at will by the examiner. The "Cold Call Scores" option is disabled until the end of the session. The examiner can then use the generated score in combination with the examiner's empirical judgement regarding the test results to arrive at a determination of the veracity of the subject with more accurate results.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A system for assigning a numeric score to a sample of a voice pattern of a human subject wherein the score is indicative of the psychological stress level of the human subject comprising:

means to convert a verbal utterance of a human subject into electrical signals which are plotted on a Cartesian coordinate system whereby a subject wave pattern having x and y axes are provided;

means for filtering said subject wave pattern to remove extraneous values at the leading and trailing edges of said subject wave pattern whereby a working frame is provided for analysis;

means to provide a consecutive series of known voice pattern characteristics, wherein said consecutive series exhibits a sequential progression in the degree of blocking in said subject wave pattern;

means for assigning a numerical value range to each of the consecutive series of known voice pattern characteristics based on the degree of blocking in said subject wave pattern;

means for analyzing said subject wave pattern within said working frame to provide quantified data which define a set of characteristics for said subject wave pattern;

means for providing quantified data which define a set of characteristics for said consecutive series of known voice pattern characteristics;

means for comparing said quantified data of said subject wave pattern within said working frame to said quantified data for each of said known voice pattern characteristics to ascertain a match between said subject wave pattern and one or more of said known voice pattern characteristics; and means for generating a score for said subject wave pattern based on said one or more matching known voice pattern characteristics.

2. The system of claim 1, further including means for applying a value averaging algorithm to the component of said subject wave pattern to filter said subject wave pattern.

3. The system of claim 1, further comprising means for measuring said subject wave pattern to determine if said subject wave pattern conforms to required characteristics for optimal analysis.

4. The system of claim 1, wherein said quantified data for said subject wave pattern and said known voice pattern characteristics includes the wave frequency.

5. The system of claim 1, wherein said quantified data for said subject wave pattern and said known voice pattern characteristics include the wave amplitude.

6. The system of claim 1, wherein said quantified data for said subject wave pattern and said known voice pattern characteristics include the number of cycles in said working frame of said subject wave pattern.

7. The system of claim 1, wherein said means for analyzing said subject wave pattern further includes means for forming a maximum point array based on the peak of each cycle in said subject wave pattern.

8. The system of claim 1, wherein said means for analyzing said subject wave pattern further includes means for forming a minimum point array based on the base of each cycle in said subject wave pattern.

9. The system of claim 1, wherein said means for analyzing said subject wave pattern further includes means for forming a midpoint array based on the midpoint between each maximum point and each minimum point in said subject wave pattern.

* * * * *